(12) United States Patent
Mitta et al.

(10) Patent No.: US 8,700,685 B2
(45) Date of Patent: Apr. 15, 2014

(54) ALLOCATION OF ASSESSMENTS

(75) Inventors: Karthik Reddy Mitta, Hyderabad (IN); Susheel Walia, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 295 days.

(21) Appl. No.: 13/153,982

(22) Filed: Jun. 6, 2011

(65) Prior Publication Data

US 2012/0310945 A1 Dec. 6, 2012

(51) Int. Cl.
*G06F 17/13* (2006.01)
*G06F 17/00* (2006.01)

(52) U.S. Cl.
USPC .................. 707/899; 379/265.12; 379/266.08

(58) Field of Classification Search
USPC ................................... 707/899; 379/265–266
See application file for complete search history.

(56) References Cited

U.S. PATENT DOCUMENTS

| | | | | |
|---|---|---|---|---|
| 6,163,607 | A | * | 12/2000 | Bogart et al. ............ 379/266.01 |
| 7,203,655 | B2 | * | 4/2007 | Herbert et al. ............... 705/7.42 |
| 2008/0162327 | A1 | | 7/2008 | Cujak et al. |
| 2010/0131341 | A1 | | 5/2010 | McKay et al. |
| 2010/0198630 | A1 | | 8/2010 | Page et al. |

* cited by examiner

*Primary Examiner* — Yicun Wu
(74) *Attorney, Agent, or Firm* — Banner & Witcoff, Ltd.; Michael A. Springs

(57) ABSTRACT

Apparatuses, computer readable media, methods, and systems are described for processing a workload record for each of a plurality of assessors, each of the workload records identifying an assessment previously assigned to a particular one of the assessors, calculating a complexity score for each of the assessments, calculating a workload index for each of the assessors based on the complexity score of the assessment previously assigned to that assessor, and assigning a new assessment to a particular one of the assessors based on the workload indexes.

20 Claims, 8 Drawing Sheets

| Complexity Factor | | Definition |
|---|---|---|
| Tier | | Supplier tier defines the level of supplier risk and performance management necessary for a supplier relationship. |
| Information security and business continuity supplier tiering and risk tool | | Supplier tiering and risk tool is used to identify and measure supplier risk. Completion of supplier tiering and risk tool determines the information security and business continuity score of the supplier. |
| Historical Performance – Previous Year data | a) Findings | Total Number of findings for the supplier in the previous year. |
| | b) Submission days | Number of days the supplier has taken to submit the online questionnaire. |
| | c) Remediation Accepted days | Number of days taken in the previous year to accept the proposed remediation. |
| | d) Number of days for closure | Number of days taken to close the assessment. |
| | e) Risk Acceptance | If supplier fails to remediate a finding within a certain timeframe, a risk acceptance process is initiated. |

| Variable | Calculation of Assessment Complexity points | | Rating | Weightage |
|---|---|---|---|---|
| | Variable list | | | |
| Tier | Tier 1 | | 4 | 4 |
| | Tier 2 | | 3 | |
| | Tier 3 | | 2 | |
| | Untiered | | 4 | |
| Information security and business continuity supplier tiering and risk tool | Information Security Risk High | Business Continuity High | 4 | 3 |
| | Information Security Risk High | Business Continuity Medium or Business Continuity Low | 3 | |
| | Information Security Medium or Low | Business Continuity High | 2 | |
| | Information Security Risk Medium | Business Continuity Medium or Business Continuity Low | 1 | |
| Historical Performance – Previous Year Data | a) Findings | <10 | 1 | 2 |
| | | >10 | 2 | |
| | b) Submission day | <28 | 1 | |
| | | >28 | 2 | |
| | c) Remediation Accepted days | <60 | 1 | |
| | | >60 | 2 | |
| | d) Number of days for closure | <208 | 1 | |
| | | >208 | 2 | |
| | e) Risk Acceptance | YES | 2 | |
| | | NO | 1 | |

FIG. 4

| Variable | Definition |
|---|---|
| Total assigned assessment complexity score | Sum of complexity scores for the assessments already assigned to assessor. |
| Phase of the Assessments Assigned | Each assessment can be in one of three different stages:<br>a) Initiation: Supplier reviews and completes the questionnaire.<br>b) Remediation Planning: Supplier and Assessor discuss any findings and develop a remediation plan, if needed.<br>c) Remediation: Supplier implements any missing controls for review by assessor and, if satisfactory, the assessment is closed. |
| Number of Findings | Categorize risk level for each finding. |

Calculation of Workload Index

600

| Variable | Variable list | Weightage |
|---|---|---|
| Total Assigned Supplier Complexity Score | Sum of complexity scores of already assigned assessments | 1 |
| Phase of the Assessments Assigned | Number of assessments in Initiation Stage | 3 |
| | Number of assessments in Remediation Planning Stage | 2 |
| | Number of assessments in Remediation Stage | 1 |
| Number of Findings | Number of High Risk Findings | 3 |
| | Number of Medium Risk Findings | 2 |
| | Number of Low Risk Findings | 1 |

FIG. 6

Formulas Table
700

| | Formulas |
|---|---|
| Complexity Score for Supplier | [Rating1*Weightage1] + [Rating2*Weightage2] + [Rating3*Weightage3] |
| Workload Index | [Number of assessments in Initiation Stage * Weightage1] + [Number of assessments in Remediation Planning Stage * Weightage2] + [Number of assessments in Remediation Stage * Weightage3] + [Number of Findings with High Risk* Weightage4] + [Number of Findings with Medium Risk* Weightage5] + [Number of Findings with Low Risk* Weightage6] + Sum of Complexity Scores of assessments already assigned to assessor |

FIG. 7

ALLOCATION OF ASSESSMENTS

BACKGROUND

Information security (IS) is becoming increasingly important for many types of organizations. IS involves protecting information, as well as systems storing the information, from unauthorized access, modification, disruption, or deletion. IS breaches can irreparably harm an organization as well as its customers and stakeholders. To avoid breaches, an organization may devote resources to securing its computer network (s) applications and databases, as well as periodically performing IS auditing of itself and any users of its information.

Prior to granting a third party access to information, an organization may perform an IS assessment of the third party's information security procedures. For example, an IS team may be composed of a group of human assessors, where one or more assessors are assigned to review the IS procedures of a particular third party. The assessor may work with the third party to remedy any potential security gaps in IS procedures prior to granting access to the information.

Often, an assessor is working on a predetermined number of assessments at the same time. When a new assessment is received, the assessor with the fewest number of pending assessments is typically assigned the new assessment. The amount of time and effort, however, required to complete an assessment may vary significantly from assessment to assessment.

The disclosure provides, inter alia, an improved manner of assigning assessments to assessors.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

According to aspects of example embodiments, apparatuses, computer readable media, methods, and systems are described for processing a workload record for each of a plurality of assessors, each of the workload records identifying an assessment previously assigned to a particular one of the assessors, calculating a complexity score for each of the assessments, calculating a workload index for each of the assessors based on the complexity score of the assessment previously assigned to that assessor, and assigning a new assessment to a particular one of the assessors based on the workload indexes.

According to further aspects of example embodiments, apparatuses, computer readable media, methods, and systems are described for processing a workload record for each of a plurality of assessors, at least one of the workload records identifying an assessment previously assigned to a particular one of the assessors, calculating a complexity score for the assessment, calculating a workload index for each of the assessors, wherein one of the workload indexes is based on the complexity score, and assigning a new assessment to a particular one of the assessors based on the workload indexes.

Aspects of the embodiments may be provided in at least one computer-readable medium and/or memory storing computer-executable instructions that, when executed by at least one processor, cause a computer or other apparatus to perform one or more of the process steps described herein.

These and other aspects of the embodiments are discussed in greater detail throughout this disclosure, including the accompanying drawings.

BRIEF DESCRIPTION OF THE DRAWINGS

The present disclosure is illustrated by way of example and not limited in the accompanying figures in which like reference numerals indicate similar elements and in which:

FIGS. 3-4 illustrate an example assessment complexity score table identifying complexity factors for determining a complexity score for a new assessment to be assigned in accordance with example embodiments.

FIGS. 5-6 illustrate example variables for determining a workload index of an assessor in accordance with example embodiments.

FIG. 7 illustrates a formulas table in accordance with example embodiments.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

Figure 1:
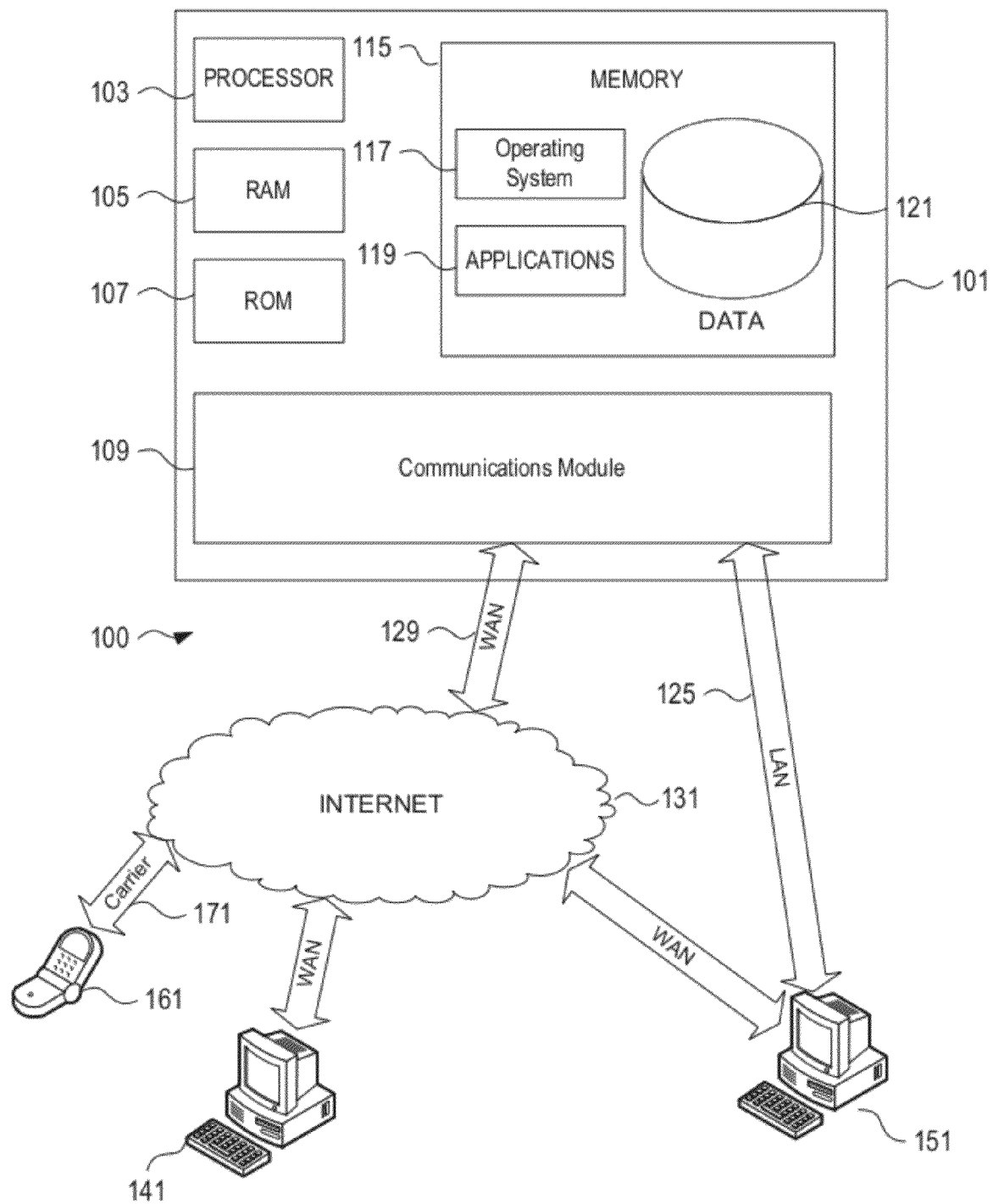
FIG. 1 shows an illustrative operating environment in which various aspects of the disclosures may be implemented in accordance with example embodiments.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The disclosure is operational with numerous other general purpose or special purpose computing system environments or configurations. Examples of well known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including random-access memory (RAM) 105, read-only memory (ROM) 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 100 may also include optical scanners (not shown). Exemplary usages include scanning and converting paper documents, e.g., correspondence, receipts, and the like to digital files.

Although not shown, RAM 105 may include one or more are applications representing the application data stored in RAM 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Also, some or all of the computer executable instructions for computing device 101 may be embodied in hardware or firmware.

Computing device 101 may operate in a networked environment supporting connections to one or more remote computing devices, such as computing devices 141, 151, and 161. The computing devices 141, 151, and 161 may be personal computing devices or servers that include many or all of the elements described above relative to the computing device 101. Computing device 161 may be a mobile device communicating over wireless carrier channel 171.

The network connections depicted in FIG. 1 include a local area network (LAN) 125 and a wide area network (WAN) 129, but may also include other networks. When used in a LAN networking environment, computing device 101 may be connected to the LAN 825 through a network interface or adapter in the communications module 109. When used in a WAN networking environment, the computing device 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server configuration to permit a user to retrieve web pages from a web-based server. Any of various conventional web browsers can be used to display and manipulate data on web pages.

Additionally, one or more application programs 119 used by the computing device 101, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that can be accessed by a computing device 101. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 101. Such a processor may execute computer-executable instructions stored on a computer-readable medium.

Figure 2:
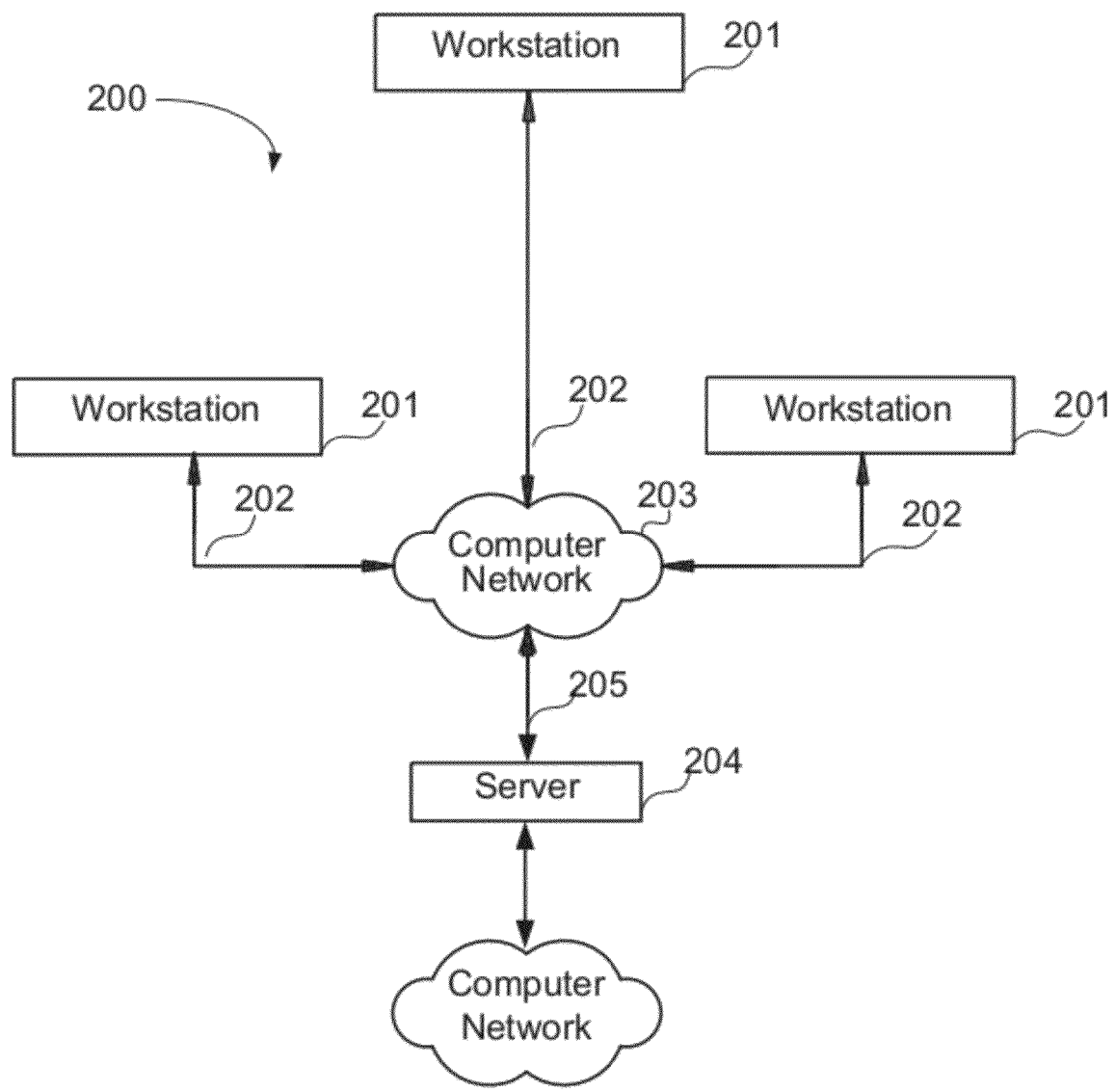
FIG. 2 is an illustrative block diagram of workstations and servers that may be used to implement the processes and functions of certain aspects of the present disclosure in accordance with example embodiments.

Referring to FIG. 2, an illustrative system 200 for implementing example embodiments according to the present disclosure is shown. As illustrated, system 200 may include one or more workstation computers 201. Workstations 201 may be local or remote, and may be connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

The steps that follow in the Figures may be implemented by one or more of the components in FIGS. 1 and 2 and/or other components, including other computing devices.

The example embodiments discussed herein provide a methodology for assigning a new assessment to a particular one of a group of assessors. In an example, a new assessment may be to review the IS procedures of a particular third party supplier that has access to or will be granted access to an organization's data. An assessment may be any type of work project that can be assigned to one or more members of a team. When assigning the new assessment, the methodology may consider a complexity of the new assessment, as well as a workload index of each assessor that is based on a total number and the complexity of assessments previously assigned to an assessor.

In an example and with reference to FIG. 1, a computing device 101 may be associated with an organization, such as a financial institution, a bank, a credit union, a company, or other entity. Such an organization may be interested, for example, in maintaining information security. The computing device 101 may receive data on parameters of a new assessment to be assigned to a particular one of a group of assessors. The computing device 101 may process the data to determine a complexity score for the assessment. The computing device 101 may also retrieve workload records for each of the assessors to determine a workload index for each. The workload index may be a numerical score indicating a workload of an assessor, for comparison to a workload index of each of the other assessors. Based on the workload index and on the complexity score for the new assessment, the computing device 101 may determine which of the assessors to assign the new assessment, as described below in further detail.

FIGS. 3-4 illustrate an example assessment complexity score table identifying complexity factors for determining a complexity score for a new assessment to be assigned or for a previously assigned assessment. The following discusses a new assessment, but the concepts may also be used for determining a complexity score for a previously assigned assessment. FIG. 3 provides a table 300 including definitions of example complexity factors, and FIG. 4 illustrates a table 400 having example values for the complexity factors. Example complexity factors may be a tier factor, an information security and business continuity supplier tiering and risk tool score factor, and a historical performance factor. The historical performance factor may consider a supplier's historical responsiveness when addressing IS issues over a time period. FIG. 3, for example, indicates that the historical performance factor is for a previous year (e.g., 2010). The historical performance factor may consider any desired length of time. Also, other complexity factors may be used, some of the complexity factors listed in table 300 may be omitted, and additional complexity factors may also be used.

With reference to FIG. 3, a tier complexity factor may define a level of supplier risk and performance management necessary for a supplier relationship. The tier complexity factor may be assigned to one of multiple values by supply chain management and/or may be determined by the computing device 101. Categorizing a supplier into a tier may be based on the service provided to the organization by the supplier, and the extent to which the supplier has access to the organization's confidential information. For example, a supplier having access to important information, such as customer lists, billing information, as well as rights to modify such information, may be placed in a higher tier (e.g., tier 1). A supplier that merely has access to read important information, but not to modify such information, may be placed in a lower tier (e.g., tier 2). A supplier that does not have access to important information, but does not access to other types of information, may be placed in a lowest tier (e.g., tier 3). Any number of tiers may be used, depending on a desired level of granularity between the tiers.

As seen in the example of FIG. 4, the tier complexity factor may be used to classify a supplier into one of tier 1, tier 2, tier 3, and untiered. Each tier may have a rating and a weightage. Computing device 101 may assign one of these tier values to the new assessment. Based on the tier value assigned, computing device 101 may identify the associated rating and weightage. For example, computing device 101 may assign the new assessment to tier 1, which has a rating of 4 and a weightage of 4. As described in further detail below, computing device 101 may determine a complexity score for the new assessment that is a function of the rating and weightage associated with each complexity factor.

Referring again to FIG. 3, computing device 101 may determine a rating and weightage for an information security and business continuity supplier tiering and risk tool score factor for the new assessment. Computing device 101 may apply a supplier tiering and risk tool computer application to identify and measure supplier information security risk. The supplier tiering and risk tool may determine what level of due diligence is needed for a particular supplier. The supplier tiering and risk tool may return a determination of information security for a supplier as well as a business continuity score of the supplier. In an example, each of information security and business continuity may be assigned a value of high, medium, or low. Other values may also be used. Referring to FIG. 4, computing device 101 may determine a rating and weightage for the information security and business continuity supplier tiering and risk tool score complexity factor. For example, if information security for the supplier is high and the business continuity score is high, computing device 101 may assign a rating of 4 and a weightage of 3 to the information security and business continuity supplier tiering and risk tool score complexity factor. If information security for the supplier is high and the business continuity score is medium or low, computing device 101 may assign a rating of 3 and a weightage of 3 to the information security and business continuity supplier tiering and risk tool score complexity factor, and so forth through the table 400.

Referring again to FIG. 3, computing device 101 may determine a rating and weightage for the historical performance factor for the new assessment. The historical performance factor may be based on a historical performance of how efficiently a supplier has remedied IS issues, as well as how well a supplier complied with IS procedures specified by the organization. The historical performance factor may be composed of a number of subfactors. Subfactors may be findings, submission days, remediation accepted days, number of days for closures, and risk acceptance.

The findings subfactor may indicate a total number of IS findings (i.e., IS issues identified) for the supplier during a time period of interest for the historical performance factor. A finding may indicate how well a supplier has historically complied with the IS procedures of the organization. A finding may also indicate that the supplier did not provide a particular IS control or violated an IS control during the historical time period of interest. Examples of findings may include a lack of a firewall for a computer network, and failing to periodically review an activity log of a firewall.

FIGS. 3-4, for example, list the previous year as the time period of interest. In FIG. 4, for example, the findings subfactor may include a threshold of 10 findings, where the computing device 101 may assign a rating of 1 and a weightage of 2 if a supplier has 10 or fewer findings in the previous year, and may assign a rating of 2 and a weightage of 2 if greater than 10 findings.

With reference again to FIG. 3, the submission days subfactor may be the number of days taken during the previous year to submit an IS questionnaire. For example, the organization, upon deciding to use a supplier, may require that the supplier periodically fill out an IS questionnaire available online. The IS questionnaire may be used to determine what IS controls the supplier has implemented and/or any changes in IS controls over time. In FIG. 4, for example, the submission days subfactor may include a threshold of 28 days, where computing device 101 may assign a rating of 1 and a weightage of 2 if a supplier submitted the IS questionnaire in 28 or fewer days in the previous year, and may assign a rating of 2 and a weightage of 2 if greater than 28 days.

With reference to FIG. 3, the remediation accepted days subfactor may indicate the number of days during the time period of interest the supplier required to accept a proposed remediation. For example, an assessor may have proposed certain a change in an IS procedure of the supplier, and the remediation accepted days subfactor may indicate how long the supplier took to implement the change. In FIG. 4, for example, the remediation accepted days subfactor may include a threshold of 60 days, where the computing device 101 may assign a rating of 1 and a weightage of 2 if a supplier required 60 or fewer days to accept the remediation during the previous year, and may assign a rating of 2 and a weightage of 2 if greater than 60 days.

With reference to FIG. 3, the number of days for assessment closure subfactor may indicate how long an assessment took to close after opening. This subfactor may, for example, indicate the total number of days from a first day when an assessment is initiated to a last day when the assessment is completed. In FIG. 4, for example, the number of days for the closure subfactor may include a threshold of 208 days, where the computing device 101 may assign a rating of 1 and a weightage of 2 if the acceptance was closed in 208 or fewer days during the previous year, and may assign a rating of 2 and a weightage of 2 if greater than 208 days.

With reference to FIG. 3, the risk acceptance subfactor may indicate whether a risk acceptance process was initiated during the time period of interest. The computing device 101 may initiate a risk acceptance process if the supplier fails to remediate a finding within a predetermined amount of time. The risk acceptance process may be a determination by the organization of whether to accept that the supplier has not remediated a finding, to discontinue using the supplier, and/or to limit to what information a supplier has access. In FIG. 4, for example, the computing device 101 may assign a rating of 2 and a weightage of 2 if a risk acceptance process was initiated due to the supplier failing to remediate one or more findings during the time period of interest, and may assign a rating of 1 and a weightage of 2 if no risk acceptance processes were initiated for the supplier. The computing device 101 may determine a rating for the historical performance factor that may be an average of the ratings determined for the subfactors.

Based on the ratings and weightings of the complexity factors determined for the supplier, the computing device 101 may determine a complexity score for the new assessment as a function of the ratings assigned to each of the factors and the weightages. An example equation for determining the complexity score is shown in the first row of the formulas table 700 in FIG. 7. In an example, for a new assessment, a tier factor may have a rating of 4 and a weightage of 4, an information security business continuity supplier tiering and risk tool score factor may have a rating of 3 and a weightage of 3, and a historical performance factor may have a rating of 2 (e.g., if all subfactors have a rating of 2, then they will have an average of 2) and a weightage of 2. The computing device 101 may multiply each rating by the corresponding weightage to determine a number of complexity points for each factor, and then sum the complexity points to determine the complexity score. In this example, the complexity score is 29 (i.e., 4×4+ 3×3+2×2).

Also, the complexity score may be based on each subfactor of the historical performance factor, rather than using an average of the ratings assigned to the subfactors. In that case, the complexity score from the previous example is 45 (i.e., 4×4+3×3+2×2+2×2+2×2+2×2+2×2).

When determining which assessor to assign the new assessment, the computing device 101 may process a workload record of each assessor to determine a workload index for each assessor. The workload record may be stored in a database, a memory, or other storage device accessible by the computing device 101. The workload record may include data on assessments that have been previously assigned to an assessor. For example, a workload record may indicate, for the assessments that have been assigned to an assessor, in which phase each of the assessments is, a number of findings for all of the assessments, and a total assigned assessment complexity score of the already assigned assessments. The workload index may be a numerical determination of how busy a particular assessor based on previously assigned assessments. Based on the workload indexes, the computing device 101 may determine which of the assessors to assign the new assessment.

FIGS. 5-6 illustrate example variables for determining a workload index of an assessor. FIG. 5 provides a table 500 including definitions of example variables, and FIG. 6 illustrates a table 600 having example values for the variables. Example variables may include a total assessment complexity score variable, a phase of assigned assessments variable, and a number of findings variable. Other variables may be used, some of the variables in table 500 may be omitted, and additional variables may also be used.

Referring to FIG. 5, the total assessment complexity score variable may be a sum of individual complexity scores of the assessments previously assigned to a particular assessor. For example, the computing device 101, using the methodology above with reference to FIGS. 3-4, may compute a complexity score for each of the assessments previously assigned to an assessor, and may sum the complexity scores to determine a value for the total assessment complexity score variable. In FIG. 6, for example, the total assessment complexity score variable may have a weightage of 1.

Referring to FIG. 5, a phase of the assigned assessments variable may indicate the phase in which each of the previously assigned assessments is for an assessor. In an example, each assessment may be in one of three phases. An initiation phase may be where a supplier is reviewing and completing the IS questionnaire. A remediation planning phase may be where a supplier and assessor discuss any IS findings, and the supplier and the assessor agree on a remediation plan, if needed, to address the IS findings. A remediation phase may be where a supplier implements any missing IS controls. When implemented, an assessor reviews the IS controls and, if satisfactory, closes the assessment. Otherwise, the assessor may continue working with the supplier until a satisfactory IS control is implemented, or the supplier fails to implement a requested IS control. In FIG. 6, for example, the total assessment complexity score variable may have a weightage of 1.

Referring to FIG. 5, the number of findings variable may indicate a number of findings at each risk level. For example, the risk level for a finding may be high, medium, or low. A high finding, for example, may indicate that information could be compromised and that the finding must be mitigated. For each of the findings, the assessor may also discuss the findings with the supplier, update comments in each finding, and track each finding until remediation has been completed. The assessor may also provide an opinion on the remediation of the finding. In FIG. 6, for example, high risk findings are associated with a weightage of 3, medium risk findings are associated with a weightage of 2, and low risk finding are associated with a weightage of 1.

To determine the workload index for a particular assessor, the computing device 101 may apply the formula listed in the second row of FIG. 7. In an example, with reference to FIG. 6, the computing device 101 may process a workload record of an assessor to determine that the assessor has 5 assessments in an initiation stage, 7 assessments in a remediation planning stage, 8 assessments in a remediation stage, 5 high risk findings, 10 medium risk findings, and 15 low risk findings. The assessor may also have a total of complexity score of 105 for the assessments previously assigned to the assessor. Using these example numbers, the computing device 101 may determine a workload index of 192 for the assessor (i.e., 5×3+7×2+8×1+5×3+10×2+15×1+105). The computing device 101 may determine a workload index for each of multiple assessors, and may assign the new assessment to the assessor having the lowest value for their workload index. If an assessor has not been previously assigned any assessments, then the computing device 101 would determine a value of zero for the workload index of that assessor.

Figure 8:
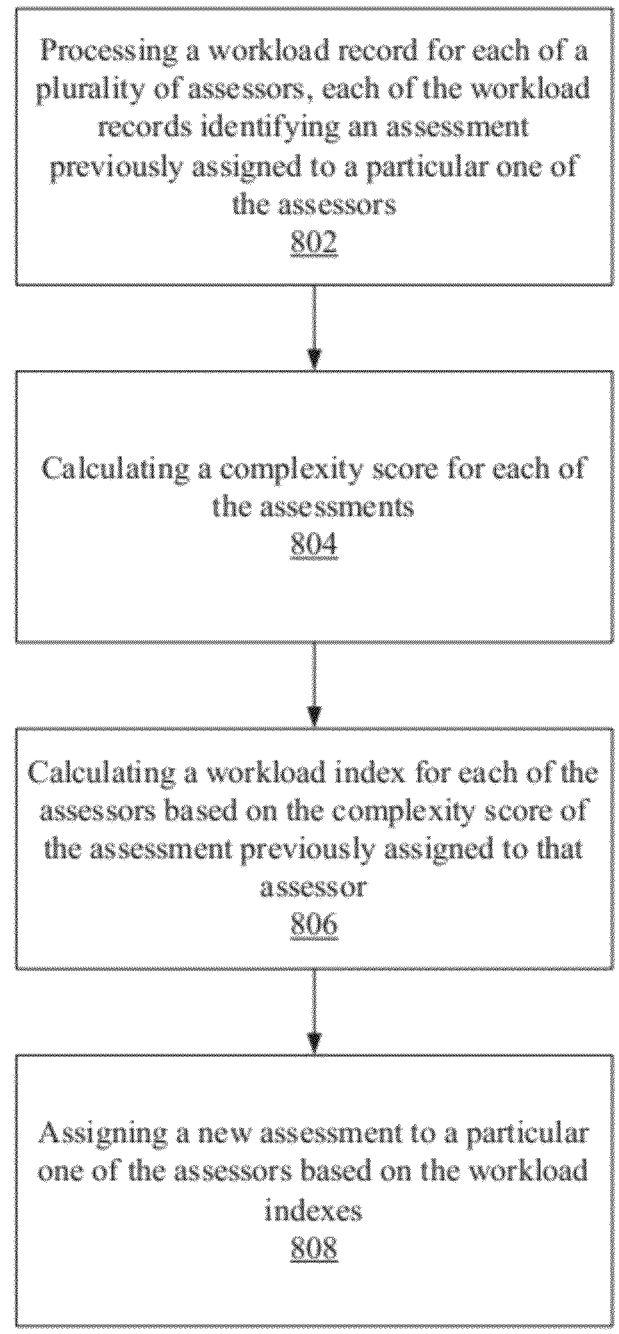
FIG. 8 illustrates an example flow diagram of a method for allocation of assessments in accordance with example embodiments.

FIG. 8 illustrates an example flow diagram of a method for allocating a new assessment to an assessor, in accordance with an example embodiment. The method may be implemented by the computing device 101 or other device. The order of the blocks depicted in FIG. 8 may be rearranged, one or more blocks may be repeated in sequential and/or non-sequential order, and/or one or more blocks may be omitted. Further, other blocks may be added to the flow diagram. The method may begin at block 802.

In block 802, the method may include processing a workload record for each of a plurality of assessors, each of the workload records identifying an assessment previously assigned to a particular one of the assessors. For example, the computing device 101 may receive a listing of assessors, and retrieve a workload record for each of the assessors. Each of the workload records may identify how many assessments have been previously assigned to each assessor. A workload record may also indicate that no assessments have been assigned to an assessor.

In block 804, the method may include calculating, by a processor, a complexity score for each of the assessments. For example, the computing device 101 may calculate a complexity of for each of the previously assigned assessments as described above with reference to FIGS. 3-4 and 7.

In block 806, the method may include calculating a workload index for each of the assessors based on the complexity score of the assessment previously assigned to that assessor. For example, the computing device 101 may calculate a workload index for each assessor in the manner discussed above with reference to FIGS. 5-7.

In block 808, the method may include assigning a new assessment to a particular one of the assessors based on the workload indexes. For example, the computing device 101 may rank the workload indexes to identify the one having a lowest value, and assign the new assessment to the assessor associated with that workload index.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments. They may determine that the requirements should be applied to third party service providers (e.g., those that maintain records on behalf of the company).

The invention claimed is:

1. An apparatus, comprising:
at least one processor; and
at least one memory storing computer executable instructions that, when executed by the at least one processor, cause the apparatus to:
process a plurality of workload records, each workload record of the plurality of workload records corresponding to an assessor of a plurality of assessors associated with a financial institution and identifying one or more assessments, of a plurality of assessments to review information-security procedures of one or more third-party suppliers of the financial institution that have been or will be granted access to data of the financial institution, previously assigned to the assessor;
calculate a plurality of complexity scores, each complexity score of the plurality of complexity scores corresponding to an assessment of the plurality of assessments to review information-security procedures of one or more third-party suppliers of the financial institution that have been or will be granted access to data of the financial institution;
calculate, based on the plurality of complexity scores, a plurality of workload indexes, each workload index of the plurality of workload indexes corresponding to an assessor of the plurality of assessors associated with the financial institution and comprising a numerical determination of how busy the assessor is based on the one or more assessments previously assigned to the assessor; and
assign, based on the plurality of workload indexes, a new assessment to review information-security procedures of one or more third-party suppliers of the financial institution that have been or will be granted access to data of the financial institution to an assessor of the plurality of assessors associated with the financial institution.

2. The apparatus of claim 1, wherein the instructions, when executed by the at least one processor, cause the apparatus to utilize a function comprising a plurality of factors to calculate each complexity score of the plurality of complexity scores, each factor of the plurality of factors being associated with a weightage for the factor and a rating for the factor.

3. The apparatus of claim 2, wherein the function is configured to multiply the rating for the factor by the weightage for the factor.

4. The apparatus of claim 1, wherein the instructions, when executed by the at least one processor, cause the apparatus to calculate at least one workload index of the plurality of workload indexes by summing multiple complexity scores of the plurality of complexity scores, the at least one workload index and the multiple complexity scores being associated with an assessor of the plurality of assessors associated with the financial institution.

5. The apparatus of claim 1, wherein the instructions, when executed by the at least one processor, cause the apparatus to calculate the plurality of workload indexes by identifying, for each assessment of the plurality of assessments to review information-security procedures of one or more third-party suppliers of the financial institution that have been or will be granted access to data of the financial institution, a phase of multiple possible phases for the assessment that the assessment is in.

6. The apparatus of claim 5, wherein the multiple possible phases for the assessment include an initiation phase for the assessment, a remediation planning phase for the assessment, and a remediation phase for the assessment.

7. The apparatus of claim 1, wherein at least one assessment of the plurality of assessments to review information-security procedures of one or more third-party suppliers of the financial institution that have been or will be granted access to data of the financial institution is associated with a finding.

8. The apparatus of claim 7, wherein the instructions, when executed by the at least one processor, cause the apparatus to calculate a workload index for the at least one assessment by identifying a risk level of the finding.

9. The apparatus of claim 1, wherein the instructions, when executed by the at least one processor, cause the apparatus to rank the plurality of workload indexes to identify an assessor of the plurality of assessors associated with the financial institution that is associated with a workload index of the plurality of workload indexes that indicates that the assessor is the least busy of the plurality of assessors associated with the financial institution, and to assign the new assessment to review information-security procedures of one or more third-party suppliers of the financial institution that have been or will be granted access to data of the financial institution to the assessor of the plurality of assessors associated with the financial institution that is associated with the workload index of the plurality of workload indexes that indicates that the assessor is the least busy of the plurality of assessors associated with the financial institution.

10. A method comprising:
processing a plurality of workload records, each workload record of the plurality of workload records corresponding to an assessor of a plurality of assessor associated with a financial institution and identifying one or more assessments, of a plurality of assessments to review information-security procedures of one or more third-party suppliers of the financial institution that have been or will be granted access to data of the financial institution, previously assigned to the assessor;
calculating a plurality of complexity scores, each complexity score of the plurality of complexity scores corresponding to an assessment of the plurality of assessments to review information-security procedures of one or more third-party suppliers of the financial institution that have been or will be granted access to data of the financial institution;
calculating, by at least one computer processor and based on the plurality of complexity scores, a plurality of workload indexes, each workload index of the plurality of workload indexes corresponding to an assessor of the plurality of assessors associated with the financial institution and comprising a numerical determination of how busy the assessor is based on the one or more assessments previously assigned to the assessor; and
assigning, based on the plurality of workload indexes, a new assessment to review information-security procedures of one or more third-party suppliers of the financial institution that have been or will be granted access to data of the financial institution to an assessor of the plurality of assessors associated with the financial institution.

11. The method of claim 10, wherein calculating the plurality of complexity scores comprises utilizing a function comprising a plurality of factors to calculate each complexity score of the plurality of complexity scores, each factor of the plurality of factors being associated with a weightage for the factor and a rating for the factor, the function being configured to multiply the rating for the factor by the weightage for the factor.

12. The method of claim 10, wherein calculating the plurality of workload indexes comprises calculating at least one workload index of the plurality of workload indexes by summing multiple complexity scores of the plurality of complexity scores, the at least one workload index and the multiple complexity scores being associated with an assessor of the plurality of assessors associated with the financial institution.

13. The method of claim 10, wherein calculating the plurality of workload indexes comprises identifying, for each assessment of the plurality of assessments to review information-security procedures of one or more third-party suppliers of the financial institution that have been or will be granted access to data of the financial institution, a phase of multiple phases for the assessment that the assessment is in.

14. The method of claim 10, wherein at least one assessment of the plurality of assessments to review information-security procedures of one or more third-party suppliers of the financial institution that have been or will be granted access to data of the financial institution is associated with a finding, and wherein calculating the plurality of workload indexes comprises calculating a workload index for the at least one assessment, wherein calculating the workload index for the at least one assessment comprises identifying a risk level of the finding.

15. The method of claim 10, wherein assigning the new assessment to review information-security procedures of one or more third-party suppliers of the financial institution that have been or will be granted access to data of the financial institution to the assessor of the plurality of assessors associated with the financial institution comprises:
ranking the plurality of workload indexes to identify an assessor of the plurality of assessors associated with the financial institution that is associated with a workload index of the plurality of workload indexes that indicates that the assessor is the least busy of the plurality of assessors associated with the financial institution; and
assigning the new assessment to review information-security procedures of one or more third-party suppliers of the financial institution that have been or will be granted access to data of the financial institution to the assessor of the plurality of assessors associated with the financial institution that is associated with the workload index of the plurality of workload indexes that indicates that the assessor is the least busy of the plurality of assessors associated with the financial institution.

16. One or more non-transitory computer-readable media comprising computer-executable instructions that, when executed by one or more computers, cause the one or more computers to:
process a plurality of workload records, each workload record of the plurality of workload records corresponding to an assessor of a plurality of assessors associated with a financial institution and identifying one or more assessments, of a plurality of assessments to review information-security procedures of one or more third-party suppliers of the financial institution that have been or will be granted access to data of the financial institution, previously assigned to the assessor;

calculating a plurality of complexity scores, each complexity score of the plurality of complexity scores corresponding to an assessment of the plurality of assessments to review information-security procedures of one or more third-party suppliers of the financial institution that have been or will be granted access to data of the financial institution;

calculate, based on the plurality of complexity scores, a plurality of workload indexes, each workload index of the plurality of workload indexes corresponding to an assessor of the plurality of assessors associated with the financial institution and comprising a numerical determination of how busy the assessor is based on the one or more assessments previously assigned to the assessor; and assign, based on the plurality of workload indexes, a new assessment to review information-security procedures of one or more third-party suppliers of the financial institution that have been or will be granted access to data of the financial institution to an assessor of the plurality of assessors associated with the financial institution.

17. The one or more non-transitory computer-readable media of claim 16, wherein the instructions, when executed by the one or more computers, cause the one or more computers to utilize a function comprising a plurality of factors to calculate each complexity score of the plurality of complexity scores, each of the plurality of factors being associated with a weightage for the factor and a rating for the factor, the function being configured to multiply the rating for the factor by the weightage for the factor.

18. The one or more non-transitory computer-readable media of claim 16, wherein the instructions, when executed by the one or more computers, cause the one or more computers to calculate at least one workload index of the plurality of workload indexes by summing multiple complexity scores of the plurality of complexity scores, that at least one workload index and the multiple complexity scores being associated with an assessor of the plurality of assessors associated with the financial institution.

19. The one or more non-transitory computer-readable media of claim 16, wherein at least one assessment of the plurality of assessments to review information-security procedures of one or more third-party suppliers of the financial institution that have been or will be granted access to data of the financial institution is associated with a finding, and wherein the instructions, when executed by the one or more computers, cause the one or more computers to calculate a workload index for the at least one assessment by identifying a risk level of the finding.

20. The one or more non-transitory computer-readable media of claim 16, wherein the instructions, when executed by the one or more computers, cause the one or more computers to rank the plurality of workload indexes to identify an assessor of the plurality of assessors associated with the financial institution that is associated with a workload index of the plurality of workload indexes that indicates that the assessor is the least busy of the plurality of assessors associated with the financial institution, and to assign the new assignment to review information-security procedures of one or more third-party suppliers of the financial institution that have been or will be granted access to data of the financial institution to the assessor of the plurality of assessors associated with the financial institution that is associated with the workload index of the plurality of workload indexes that indicates that the assessor is the least busy of the plurality of assessors associated with the financial institution.

\* \* \* \* \*